United States Patent
Baldwin et al.

(10) Patent No.: US 10,146,783 B2
(45) Date of Patent: Dec. 4, 2018

(54) USING FILE ELEMENT ACCESSES TO SELECT FILE ELEMENTS IN A FILE SYSTEM TO DEFRAGMENT

(71) Applicant: International Business Machines Corporation, Armonk, NY (US)

(72) Inventors: Duane M. Baldwin, Mantorville, MN (US); John T. Olson, Tucson, AZ (US); Sandeep R. Patil, Pune (IN); Riyazahamad M. Shiraguppi, Pune (IN); Gail A. Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 302 days.

(21) Appl. No.: 14/146,645

(22) Filed: Jan. 2, 2014

(65) Prior Publication Data
US 2015/0186401 A1    Jul. 2, 2015

(51) Int. Cl.
*G06F 17/30* (2006.01)

(52) U.S. Cl.
CPC .................. *G06F 17/30135* (2013.01)

(58) Field of Classification Search
CPC ................................................ G06F 17/30135
See application file for complete search history.

(56) References Cited

U.S. PATENT DOCUMENTS

| | | | |
|---|---|---|---|
| 6,735,678 B2 | 5/2004 | Noble et al. | |
| 7,124,272 B1 | 10/2006 | Kennedy et al. | |
| 7,447,836 B2 | 11/2008 | Zhang et al. | |
| 7,702,870 B2 | 4/2010 | English et al. | |
| 7,873,806 B2 | 1/2011 | Prahlad et al. | |
| 8,386,434 B2 | 2/2013 | Kusters et al. | |
| 8,682,870 B1 | 3/2014 | Gardner et al. | |
| 8,909,887 B1 * | 12/2014 | Armangau | G06F 3/0643 707/693 |
| 9,330,009 B1 * | 5/2016 | Throop | G06F 12/0866 |
| 2005/0102475 A1 | 5/2005 | Reohr et al. | |
| 2007/0113036 A1 | 5/2007 | Gal-Oz | |
| 2007/0226436 A1 | 9/2007 | Cheng et al. | |
| 2008/0077762 A1 | 3/2008 | Scott et al. | |
| 2008/0263059 A1 * | 10/2008 | Coca | G06F 3/0613 |
| 2008/0313245 A1 | 12/2008 | Langley et al. | |
| 2009/0055450 A1 | 2/2009 | Biller | |
| 2010/0180093 A1 | 7/2010 | Huber et al. | |
| 2013/0091185 A1 | 4/2013 | Dar et al. | |

(Continued)

OTHER PUBLICATIONS

Disk Defragmenter (Windows), Wikipedia, [online] [retreived Sep. 29, 2013], http://en.wikipedia.org/w/index.php?title=Disk_Defragmenter_(Window.

(Continued)

*Primary Examiner* — Etienne P Leroux
(74) *Attorney, Agent, or Firm* — David W. Victor; Konrad Raynes Davda & Victor LLP (57) ABSTRACT

Provided are a computer program product, system, and method for using file element accesses to select file elements in a file system to defragment. A determination is made of accesses to file elements in the file system. The determined accesses to the file elements are used to select the file elements to defragment and the selected file elements are defragmented.

25 Claims, 6 Drawing Sheets

(56) References Cited

U.S. PATENT DOCUMENTS

| | | | |
|---|---|---|---|
| 2013/0185508 A1* | 7/2013 | Talagala | G06F 12/0871 711/118 |
| 2014/0025637 A1 | 1/2014 | Yueh | |
| 2014/0156610 A1* | 6/2014 | Akers | G06F 17/30135 707/693 |
| 2015/0186402 A1 | 7/2015 | Baldwin et al. | |

OTHER PUBLICATIONS

"Defragmentation", Wikipedia, [online] [retreived Oct. 5, 2013], http://en.wikipedia.org/w/index.php?title=Defragmentation&printable=yes.
U.S. Appl. No. Unknown, filed Jan. 2, 2014, (18.509).
Office Action dated Feb. 4, 2016, pp. 30, for U.S. Appl. No. 14/146,649, filed Jan. 2, 2014, (18.509).
Response dated May 4, 2016, pp. 12, to Office Action dated Feb. 4, 2016, pp. 30, for U.S. Appl. No. 14/146,649, filed Jan. 2, 2014, (18.509).
Final Office Action dated Jul. 8, 2016, pp. 30, for U.S. Appl. No. 14/146,649, filed Jan. 2, 2014, (18.509).
RCE Response dated Oct. 10, 2016, pp. 24, to Final Office Action dated Jul. 8, 2016, pp. 30, for U.S. Appl. No. 14/146,649, filed Jan. 2, 2014, (18.509).
Interview Agenda dated Sep. 9, 2016, pp. 2 for U.S. Appl. No. 14/146,649, filed Jan. 2, 2014, (18.509).
Office Action dated Dec. 12, 2016, pp. 33, for U.S. Appl. No. 14/146,649, filed Jan. 2, 2014, (18.509).
Response dated Mar. 13, 2017, pp. 16, to Office Action dated Dec. 12, 2016, pp. 33, for U.S. Appl. No. 14/146,649, filed Jan. 2, 2014, (18.509).
Final Office Action dated Jun. 9, 2017, pp. 35, for U.S. Appl. No. 14/146,649, filed Jan. 2, 2014, (18.509).
Response dated Jul. 30, 2017, pp. 17, to Final Office Action dated Jun. 9, 2017, pp. 35, for U.S. Appl. No. 14/146,649, filed Jan. 2, 2014, (18.509).
Office Action dated Oct. 16, 2017, pp. 39, for U.S. Appl. No. 14/146,649, filed Jan. 2, 2014, (18.509).
Response dated Jan. 8, 2018, pp. 17, to Office Action dated Oct. 6, 2017, pp. 39, for U.S. Appl. No. 14/146,649, filed Jan. 2, 2014, (18.509).
Final Office Action dated Apr. 17, 2018, pp. 35, for U.S. Appl. No. 14/146,649, filed Jan. 2, 2014, (18.509).
Response dated Jun. 18, 2018, pp. 17, to Final Office Action dated Apr. 17, 2018, pp. 35, for U.S. Appl. No. 14/146,649, filed Jan. 2, 2014, (18.509).
Notice of Allowance dated Jul. 27, 2018, pp. 19, for U.S. Appl. No. 14/146,649.

* cited by examiner

File Element Access Information

USING FILE ELEMENT ACCESSES TO SELECT FILE ELEMENTS IN A FILE SYSTEM TO DEFRAGMENT

BACKGROUND OF THE INVENTION

1. Field of the Invention

The present invention relates to a computer program product, system, and method for using file element accesses to select file elements in a file system to defragment.

2. Description of the Related Art

A file system provides a framework for naming and indexing files and arranging them on storage devices, such as an electro-magnetic disk drive, for storage and retrieval. File system functionality can be divided into two components, a user component and a storage component. The user component is responsible for managing files within directories, file path traversals and user access to the file. The storage component of the file system determines where files are physically stored on the storage devices.

In a disk storage system, as the stored files and other objects grow in size, additional storage space is required. Additional space for a file that has increased in size may be allocated at non-contiguous locations to where other blocks of the file are stored. Further, when files or blocks of files are deleted, the freed space may result in blocks for a file being in discontiguous locations. This leads to disk fragmentation of the discontiguous storage of blocks of a single logical object. A file layout that is discontiguous may adversely affect system performance because contiguous logical blocks that are likely to be accessed sequentially may not be stored at contiguous physical locations on the disk, thereby requiring the disk drive read head to seek and rotate the disk head to move to a discontiguous location to read further blocks for a file.

Disk defragmentation describes the process of consolidating fragmented files on the disk surface. A disk defragmenter is a software tool that rearranges and moves blocks of data on the hard disk surface so contiguous logical blocks are at contiguous physical locations on the disk surface to avoid latencies resulting from the drive read head having to seek to a discontiguous location for contiguous logical blocks. Disk management and defragmentation utilities may be bundled with operating system components or available as separate applications.

SUMMARY

Provided are a computer program product, system, and method for using file element accesses to select file elements in a file system to defragment. A determination is made of accesses to file elements in the file system. The determined accesses to the file elements are used to select the file elements to defragment and the selected file elements are defragmented.

DETAILED DESCRIPTION

Disk defragmentation is costly in terms of the system resources used to move data from non-contiguous to contiguous locations on the disk surface. The data movement operations for the defragmentation process not only place additional stress on the system, but also degrade application performance while the defragmentation is in progress. Even if defragmentation is performed during low Input/Output (I/O) activity, the defragmentation process may block application access to requested blocks that are in the process of being moved. Further in large file-systems containing thousands of files and terabytes of data, the defragmentation process can continue for many hours, even days, and negatively impact system performance during this time.

Described embodiments provide techniques for selecting files to defragment based on I/O access activity to the files to select files that are accessed more frequently for defragmentation and skip defragmenting files whose access metrics fall below an access threshold, i.e., sufficiently infrequently accessed files. Defragmenting more frequently accessed files means that the benefits of defragmentation are more frequently realized with less defragmentation work and impact. Defragmentation involves moving sparsely distributed data to contiguous location on the disk. The defragmenter may locate more frequently accessed file blocks on the outer tracks of the disk surface as better read/write performance occurs on the outer tracks.

Figure 1:
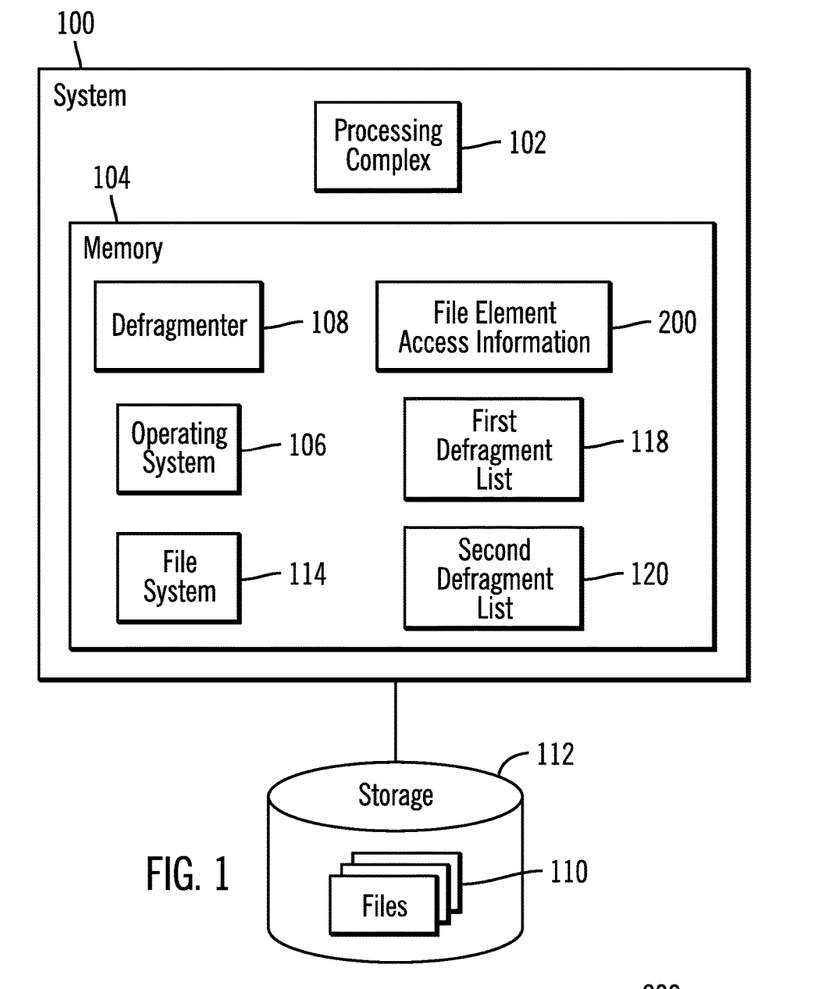
FIG. 1 illustrates an embodiment of a computing environment.

FIG. 1 illustrates an embodiment of a defragmentation computing environment. A system 100, such as a computer, server, etc., includes a processing complex 102 comprising one or more processors, each including one or more processing cores, and a memory 104 storing various program modules and data structures executed by the processor 102, including an operating system 106 and a defragmenter 108 to defragment files 110 created by the operating system 106 and stored in storage 112. The defragmenter 108 may be a component or module within the operating system 106 or an application external to the operating system 106, such as shown in FIG. 1.

The operating system 106 implements a file system 114 that provides access to the files 110 and metadata and information on the files formed in the file system 114. The defragmenter maintains file element access information 200 having information on read and/or write accesses to file elements in the file system 114. The file element access information 200 may be part of the file system 114 metadata or maintained in separate files maintained by the defragmenter 108. A file element comprises a file allocated in the file system 114 or a logical or physical block allocated to a file 110 in the file system 114. The file system 114 includes file metadata, such as a File Allocation Table, that indicates for each file name a list of blocks allocated to that file, which blocks may comprise logical blocks, e.g., logical block addresses (LBAs), physical addresses on the storage 112, etc. In this way, defragmentation may be performed on a file level basis to defragment at once a file and all the blocks allocated to the file or performed on a block level basis where blocks are defragmented based on accesses to specific blocks, not the file as a whole.

The defragmenter 108 maintains a first defragment list 118 of file elements (e.g., files or blocks allocated to files) to defragment that have an access metric related to the number of accesses to the file elements that exceeds an access threshold and a second defragment list 120 having file elements having an access metric that falls below the access threshold. The first defragment list 118 comprises the list of file elements that are defragmented first before those having lower access metrics that are indicated in the second defragment list 120. In this way, the defragmenter 108 prefers to defragment file elements having a greater level of activity, i.e., higher access metric. This is beneficial because performance improvements related to defragmentation are more frequently realized for files more frequently accessed than less frequently accessed files.

Figure 2:
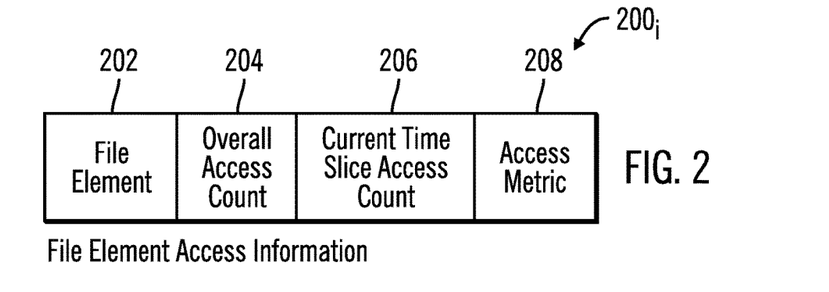
FIG. 2 illustrates an embodiment of file access information.

FIG. 2 illustrates an embodiment of an instance of file element access information 200, included in the file system access information 200, and includes a file element 202 identifier; an overall access count 204 indicating a number of read and write accesses to the file element 202 since it was created; a current time slice access count 206 indicating a number of accesses during a current time period being tracked; and an access metric 208 resulting from a function that weights the overall access count 204 and the current time slice access count 206.

In one embodiment the access metric 208 may be calculated by weighting the overall access count 204 by a weight value between 0 and 1, plus weighting the current time slice access count 206 by one minus the weight value. In this way, the more current or overall accesses may be provided more weight in the calculation depending on the setting for the weight value, which may be user configured. Equation 1 shows the calculation with the access metric 208 and a weight value "A" between 0 and 1: (1) access metric=A*overall access count+(1−A)*current time slice access count.

Figure 3:
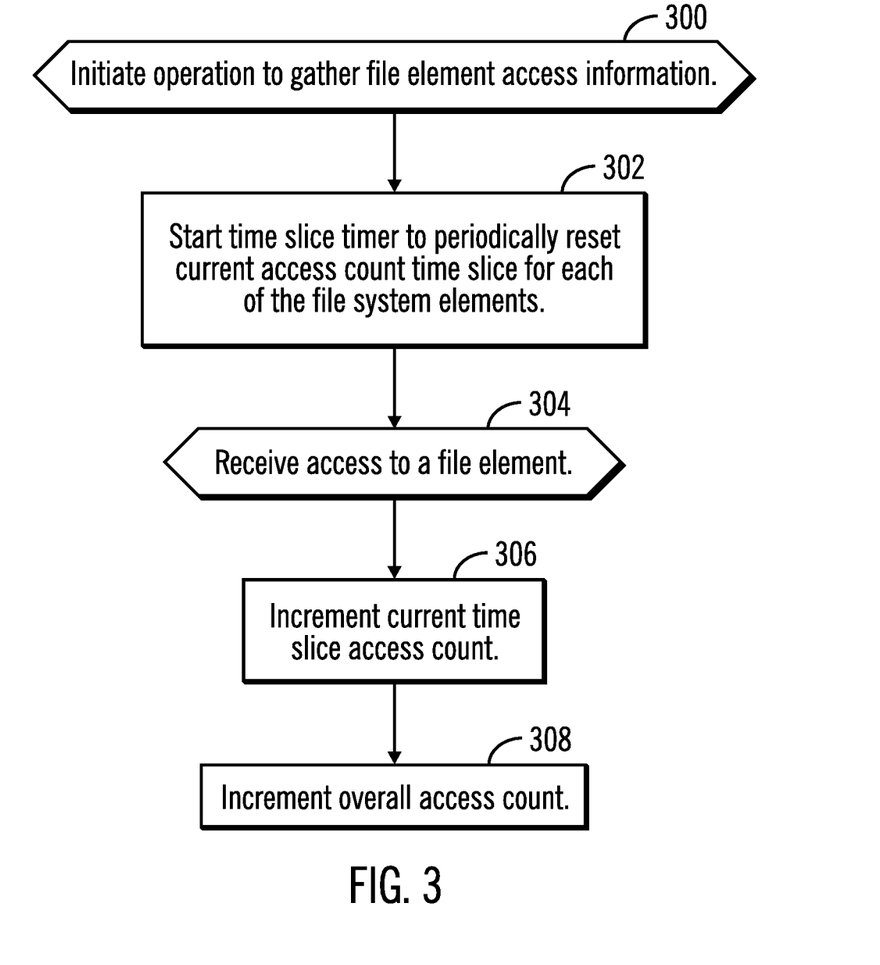
FIG. 3 illustrates an embodiment of operations to gather file element access information.

FIG. 3 illustrates an embodiment of operations performed by the defragmenter 108 and/or operating system 106 to gather the file element access information. Upon initiating (at block 300) access information gathering, a time slice timer is started (at block 302) to periodically reset the current access count time slice 206 for each of the file system elements 202 being tracked. Upon receiving (at block 304) an access (read or write) to a file element 202, the current time slice access count 206 is incremented (at block 306) and the overall access count 204 is incremented (at block 308).

Figure 4:
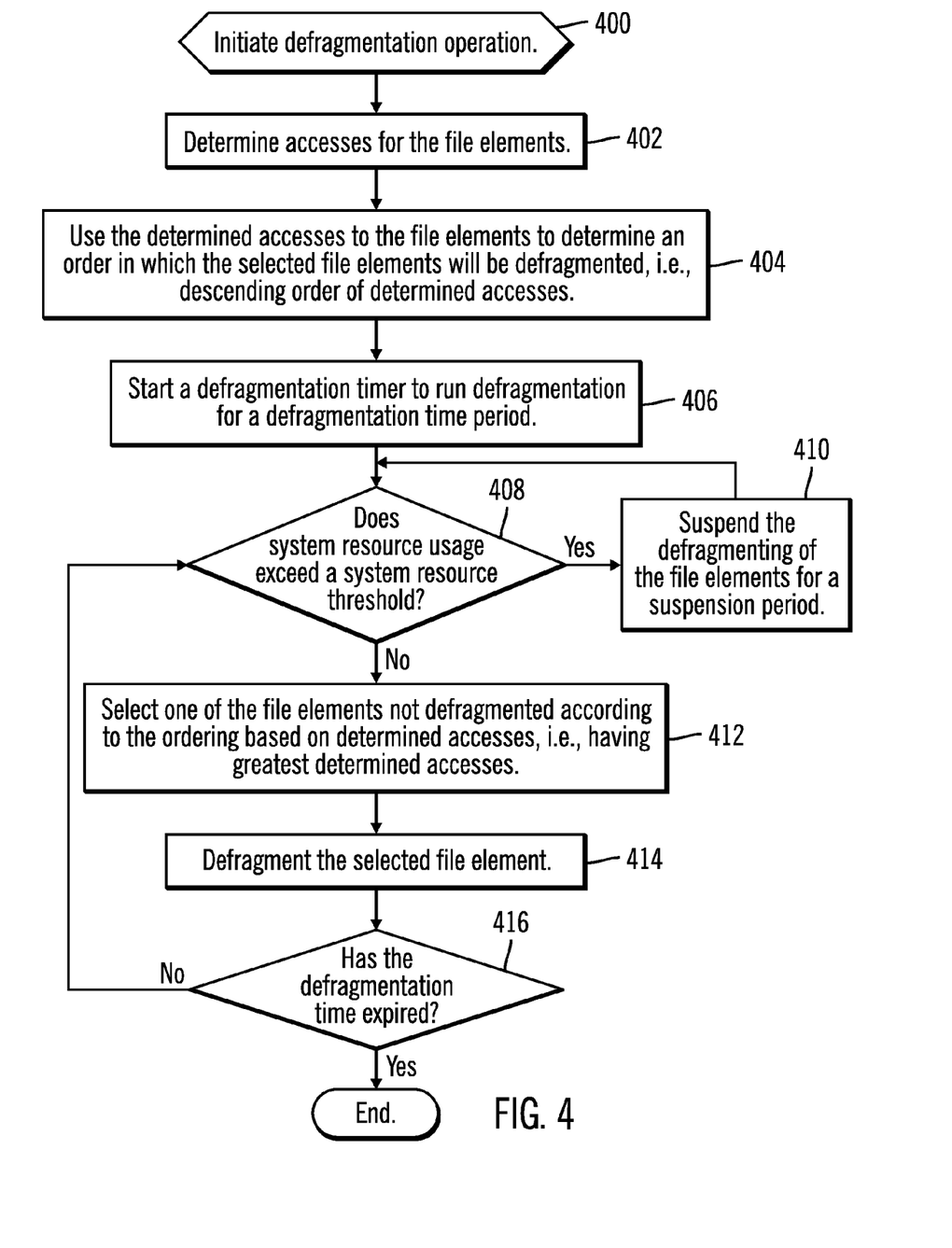
FIG. 4 illustrates an embodiment of a defragmentation operation.

FIG. 4 illustrates an embodiment of operations performed by the defragmenter 108 to defragment file elements in the file system 114. Upon initiating (at block 400) file defragmentation, the defragmenter 108 determines (at block 402) accesses for the file elements. In one embodiment, the determined accesses may comprise a value related to accesses of the file elements, such as a weighted value based on a weighting of current accesses 206 and the overall access count 204. The defragmenter 108 uses (at block 404) the determined accesses to the file elements to determine an order in which the selected file elements will be defragmented, i.e., descending order of determined accesses, which may comprise an access metric calculated from the access counts for a file element. A defragmentation timer is started (at block 406) to run defragmentation for a defragmentation time period.

Before defragmenting, the defragmenter 108 may determine a system 100 resource usage, which may be based on usage of the processor 102 and memory 104 resources, or storage and host adaptor usage. If (at block 408) the system 100 resource usage exceeds a system resource threshold, then the defragmenter 108 suspends (at block 410) the defragmenting of the file elements for a suspension period. After suspending, control proceeds back to block 408 to determine whether system resource usage again exceeds a threshold. If (at block 408) the system resource usage does not exceed the threshold, then the defragmenter 108 selects (at block 412) one of the file elements not defragmented according to the ordering based on the determined accesses, i.e., having greatest determined accesses of file elements not yet defragmented. The selected file element in the storage 112 is defragmented (at block 414). After defragmenting, if (at block 416) the defragmentation time has not expired, then control proceeds back to block 408 to determine whether to proceed to defragment a next file element. If (at block 416) the defragmentation time period or timer has expired, then control ends.

In one embodiment, the defragmentation of the file element in the storage 112 may write the selected file elements into contiguous regions or fragments of the storage 112, which may comprise an electro mechanical disk drive, to store files into a smallest number of contiguous regions and create larger regions of free space.

Figure 5:
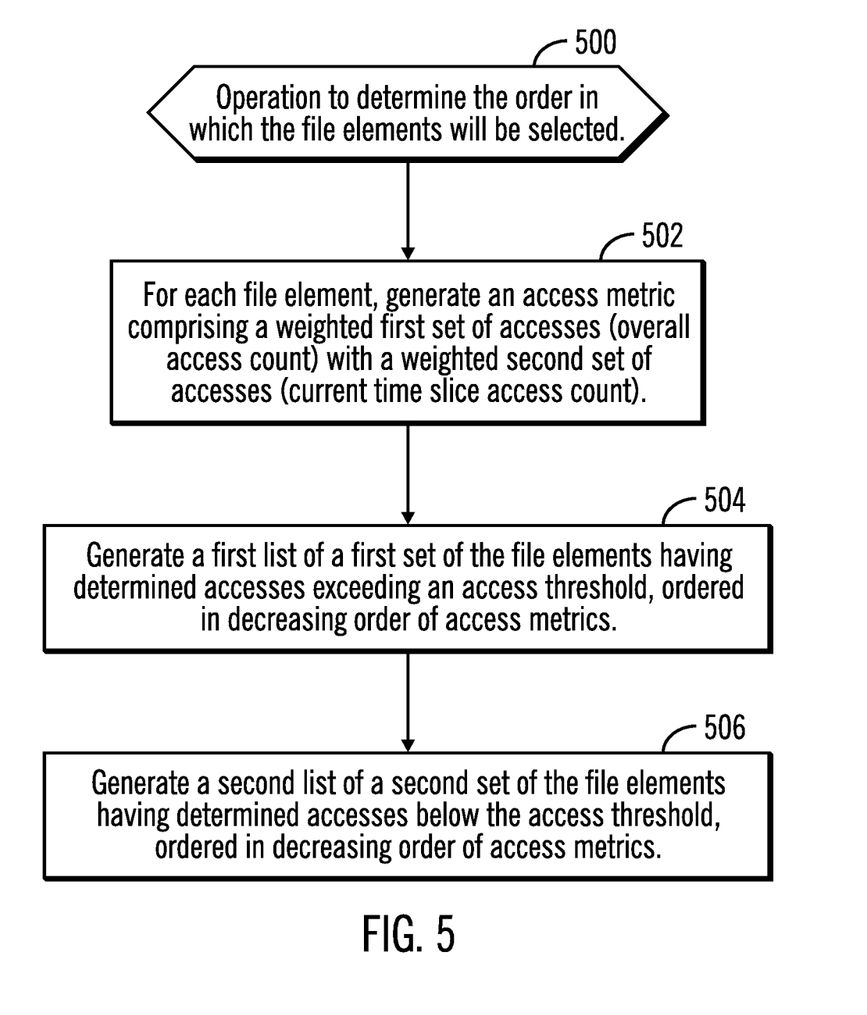
FIG. 5 illustrates an embodiment of operations to determine the order in which to defragment file elements.

FIG. 5 illustrates an embodiment of operations performed by the defragmenter 108 and/or the operating system 106 to determine the order in which the file elements will be selected, such as the operation at block 404 in FIG. 4. Upon initiating the operation (at block 500), the defragmenter 108, for each file element, generates (at block 502) an access metric 208 which may comprise a function performed with respect to gathered access data for the file element. In one embodiment, the access metric 208 may comprise a weighted first set of accesses, e.g., overall access count 204, and a weighted second set of accesses, e.g., current time slice access count 206. In other embodiments, different functions on gathered access data may be utilized to calculate the access metric providing an indication of an extent of file access other than those described herein. The defragmenter 108 then generates (at block 504) a first defragment list 118, or first list, of a first set of the file elements having determined accesses exceeding an access threshold, where the file elements indicated in the list are ordered in decreasing order of access metric 208. The defragmenter 108 further generates (at block 506) a second defragment list 120, or second list, of a second set of the file elements having access metrics 208 less than the access threshold, where the file elements indicated in the second list 120 are ordered in decreasing order of the access metrics. In this way, the defragmenter 108 separates the file elements to defragment based on a level of access to the file elements to determine an order in which the file elements are selected for defragmentation.

Figure 6:
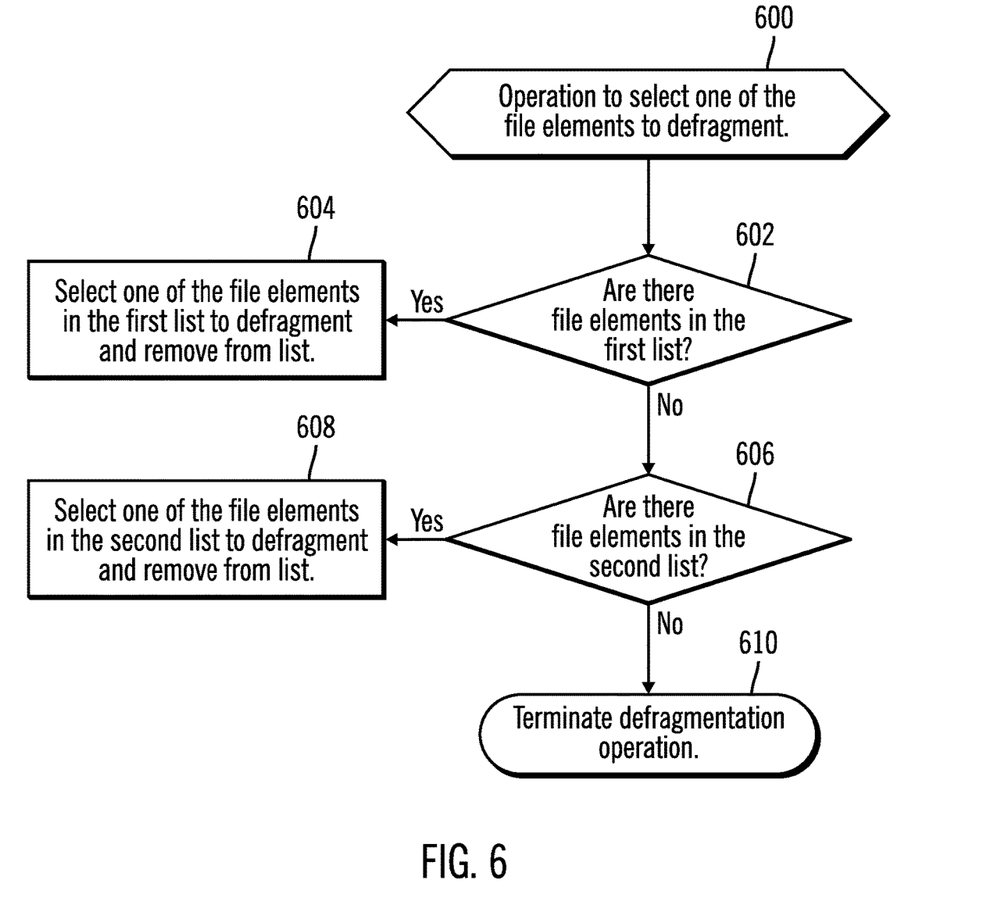
FIG. 6 illustrates an embodiment of operations to select file elements to defragment.

FIG. 6 illustrates an embodiment of operations performed by the defragmenter 108 and/or the operating system 106 to select one of the file elements 200 not yet defragmented to defragment, such as the operation at block 412 in FIG. 4. Upon initiating (at block 600) the operation to select one of the file elements to defragment, if (at block 602) there are file elements in the first defragment list 118, or first list, then the defragmenter 108 selects (at block 604) one of the file elements 200 in the first list 108 to defragment and removes the selected file element from the first list 108. If (at block 602) there are no elements on the first list 108, and if (at block 606) there are elements on the second defragment list 120, then the defragmenter 108 selects (at block 608) one of the file elements in the second defragment list 120 to defragment and removes that selected and defragmented element from the list 120. The selected file elements at blocks 604 and 608 may comprise the first element on the list in an order according to descending access metrics, so that the file element on the first list 108 having the highest access metric, i.e., most accessed of the file elements, is selected for defragmentation. If (at block 606) there are no file elements on either list 118 or 120 to defragment, then the defragmentation operation is terminated (at block 610).

Described embodiments provide techniques to perform defragmentation in a manner that favors defragmenting more active files over less active files to maximize the realization of the performance benefits of defragmentation. Bypassing defragmentation of non-active files reduces the defragmentation duration to defragment the more active files, where the benefits of defragmentation are more noticeable. Reducing the defragmentation duration conserves system resources and power consumption for more critical system and application operations.

Described embodiments optimize the defragmentation process by performing selective defragmentation in a prioritized manner by ordering files based on an activity related metric, so that file elements, files or file blocks, are selected for migration based on an access metric. In certain embodiments, defragmentation will be performed according to a priority order based on the access metric to defragment the most active files first whose access metric exceeds an access threshold. For non-active files, defragmentation may be skipped or performed if there is time remaining in the defragmentation duration after defragmenting all file elements having an activity metric exceeding the threshold.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the Figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 7:
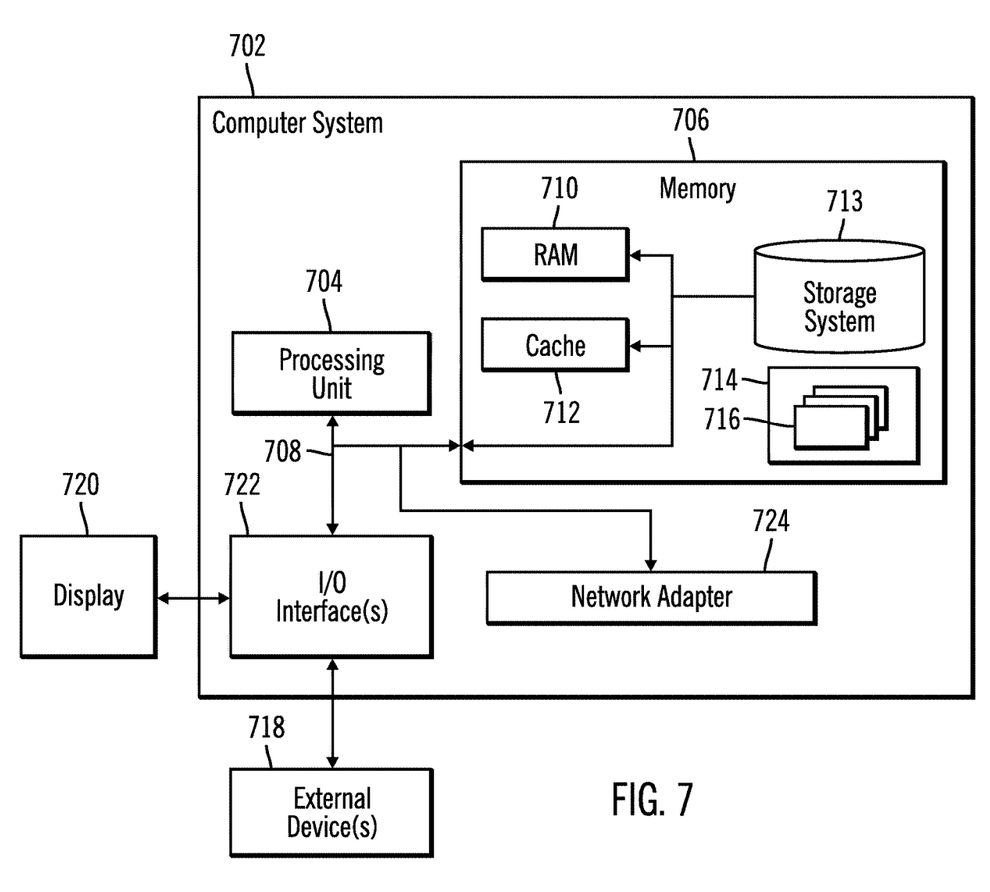
FIG. 7 illustrates a computing environment in which embodiments may be implemented.

The system 100 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular resources or implement particular abstract data types. Computer system/server 702 may be practiced in distributed cloud computing environments where resources are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 2 may be implemented as program modules 716 which generally carry out the functions and/or methodologies of embodiments of the invention as described herein.

Computer system/server 702 may also communicate with one or more external devices 718 such as a keyboard, a pointing device, a display 720, etc.; one or more devices that enable a user to interact with computer system/server 12; and/or any devices (e.g., network card, modem, etc.) that enable computer system/server 702 to communicate with one or more other computing devices. Such communication can occur via Input/output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for defragmenting file elements in a file system in storage, the computer program product comprising a non-transitory computer readable storage medium having computer readable program code embodied therein that executes to perform operations, the operations comprising:
   determining accesses to each of the file elements in the file system to determine access metrics for each of the file elements, wherein the access metrics for the file elements indicate levels of access to the file elements;
   determining a first set of the file elements and a second set of the file elements, such that the access metrics of the first set of the elements indicate levels of access that are greater than the levels of access indicated by the access metrics for the second set of the file elements;
   initiating a series of a defragmentation operation during a defragmentation time period to select the file elements from the first set of the file elements or the second set of the file elements to defragment;
   in response to initiating the series of the defragmentation operation during the defragmentation time period, determining whether to defragment the first set;
   defragmenting one of the file elements from the first set of the file elements in response to determining to defragment the first set;
   defragmenting one of the file elements in the second set of the file elements in response to determining not to defragment the first set;
   in response to defragmenting one of the file elements in the first or second set, determining whether a condition with respect to a system resource usage indicates to continue defragmentation;
   initiating another of the defragmentation operation during the defragmentation time period in response to determining that the condition with respect to the system resource usage indicates to continue defragmentation; and
   terminating the series of the defragmentation operation in response to at least one of determining that the condition with respect to the system resource usage does not indicate to continue defragmentation and the defragmentation time period has expired.

2. The computer program product of claim 1, wherein the operations further comprise:
   using the determined accesses to the file elements to determine an order in which the file elements in the first and the second sets will be defragmented.

3. The computer program product of claim 2, wherein the determining whether the condition with respect to the system resource usage indicates to continue the defragmentation comprises:
   determining whether the system resource usage exceeds a system resource threshold;
   continuing to defragment the file elements during the first or the second defragmenting according to the order in response to determining that the system resource usage does not exceed the system resource threshold; and
   suspending the first or the second defragmenting of the file elements in response to determining that the system resource usage exceeds the system resource threshold.

4. The computer program product of claim 1, wherein the operations further comprise:
   determining the file elements having the levels of access that exceed an access threshold, wherein the file elements in the first set have levels of access that exceed the access threshold and the file elements in the second set have levels of access that fall below the access threshold.

5. The computer program product of claim 1, wherein the first set of the file elements is defragmented during a defragment time period in response to the defragment time period not expiring, wherein the second set of the file elements is defragmented during the defragment time period in response to defragmenting all of the first set of the file elements and in response to the defragment time period not expiring, wherein the defragmenting one of the file elements in the first and second sets of the file elements is only performed after defragmenting file elements having a higher activity level and if the defragment time period has not expired, wherein the file elements having a lower activity level are skipped for defragmentation if the defragment time period expires before defragmenting file elements having higher activity levels.

6. The computer program product of claim 1, wherein the file elements for which accesses are determined and defragmentation performed comprise at least one of files in the file system and blocks allocated to a file in the file system.

7. The computer program product of claim 1, wherein the determining the accesses for the file elements comprises determining a first set of accesses over a first time period and a second set of accesses over a second time period, and wherein using the determined accesses to determine the access metrics for the file elements comprises:
   weighting the first set of accesses and the second set of accesses for the file elements to determine the access metrics for the file elements.

8. The computer program product of claim 7, wherein the first time period extends from when the file elements were created to a current time and wherein the second time period extends from a time after the file elements were created to the current time.

9. The computer program product of claim 8, further comprising:
   periodically restarting the second time period to clear the second set of accesses and restart a count of file accesses for the second set of accesses.

10. The computer program product of claim 1, wherein the first set of the file elements is ordered in a decreasing order based on the access metrics of the file elements in the first set, wherein in the decreasing order a most accessed of the first set of the file elements is selected before less accessed file elements in the first set.

11. The computer program product of claim 10, wherein the second set of the file elements is ordered in the decreasing order based on the access metrics of the file elements in the second set, wherein in the decreasing order a most accessed of the second set of the file elements is selected before less accessed file elements in the second set.

12. A system for defragmenting file elements in a file system in storage, comprising:
a processor; and
a computer readable storage medium including a computer program that when executed by the processor performs operations, the operations comprising:
determining accesses to each of the file elements in the file system to determine access metrics for each of the file elements, wherein the access metrics for the file elements indicate levels of access to the file elements;
determining a first set of the file elements and a second set of the file elements, such that the access metrics of the first set of the elements indicate levels of access that are greater than the levels of access indicated by the access metrics for the second set of the file elements;
initiating a series of a defragmentation operation during a defragmentation time period to select the file elements from the first set of the file elements or the second set of the file elements to defragment:
in response to initiating the series of the defragmentation operation during the defragmentation time period, determining whether to defragment the first set;
defragmenting one of the file elements from the first set of the file elements in response to determining not to defragment the first set;
defragmenting one of the file elements in the second set of the file elements in response to determining not to defragment the first set;
in response to defragmenting one of the file elements in the first or second set, determining whether a condition with respect to a system resource usage indicates to continue defragmentation;
initiating another instance of the defragmentation operation during the defragmentation time period in response to determining that the condition with respect to the system resource usage indicates to continue defragmentation; and
terminating the series of the defragmentation operation in response to at least one of determining that the condition with respect to the system resource usage does not indicate to continue defragmentation and the defragmentation time period has expired.

13. The system of claim 12, wherein the operations further comprise:
using the determined accesses to the file elements to determine an order in which the file elements in the first and the second sets will be defragmented.

14. The system of claim 12, wherein the operations further comprise:
determining the file elements having the levels of access that exceed an access threshold, wherein the file elements in the first set have levels of access that exceed the access threshold and the file elements in the second set have levels of access that fall below the access threshold.

15. The system of claim 12, wherein the first set of the file elements is defragmented during a defragment time period in response to the defragment time period not expiring, wherein the second set of the file elements is defragmented during the defragment time period in response to defragmenting all of the file elements having the determined accesses that exceed a threshold and in response to the defragment time period not expiring, wherein the defragmenting one of the file elements in the first and second sets of the file elements is only performed after defragmenting file elements having a higher activity level and if the defragment time period has not expired, wherein the file elements having a lower activity level are skipped for defragmentation if the defragment time period expires before defragmenting file elements having higher activity levels.

16. The system of claim 12, wherein the determining the accesses for the file elements comprises determining a first set of accesses over a first time period and a second set of accesses over a second time period, and wherein using the determined accesses to determine the access metrics for the file elements comprises:
weighting the first set of accesses and the second set of accesses for the file elements to determine the access metrics for the file elements.

17. The system of claim 12, wherein the first set of the file elements is ordered in a decreasing order based on the access metrics of the file elements in the first set, wherein in the decreasing order a most accessed of the first set of the file elements is selected before less accessed file elements in the first set.

18. The system of claim 17, wherein the second set of the file elements is ordered in the decreasing order based on the access metrics of the file elements in the second set, wherein in the decreasing order a most accessed of the second set of the file elements is selected before less accessed file elements in the second set.

19. A method for defragmenting file elements in a file system in storage, comprising:
determining accesses to each of the file elements in the file system to determine access metrics for the file elements, wherein the access metrics for the file elements indicate levels of access to the file elements;
determining a first set of the file elements and a second set of the file elements, such that the access metrics of the first set of the elements indicate levels of access that are greater than the levels of access indicated by the access metrics for the second set of the file elements;
initiating a series of a defragmentation operation during a defragmentation time period to select the file elements from the first set of the file elements or the second set of the file elements to defragment in response to initiating the series of the defragmentation operation during the defragmentation time period, determining whether to defragment the first set;
defragmenting one of the file elements in the second set of the file elements in response to determining to defragment the first set;
in response to defragmenting one of the file elements in the first or second set, determining whether a condition with respect to a system resource usage indicates to continue defragmentation;
initiating another instance of the defragmentation operation during the defragmentation time period in response to determining that the condition with respect to the system resource usage indicates to continue defragmentation; and terminating the series of the defragmentation operation in response to at least one of determining that the condition with respect to the system resource usage does not indicate to continue defragmentation and the defragmentation time period has expired.

20. The method of claim 19, further comprising:
using the determined accesses to the file elements to determine an order in which the file elements in the first and the second sets will be defragmented.

21. The method of claim 19, further comprising:
determining the file elements having the levels of access that exceed an access threshold, wherein the file elements in the first set have levels of access that exceed the access threshold and the file elements in the second set have levels of access that fall below the access threshold.

22. The method of claim 19, wherein the first set of the file elements is defragmented during a defragment time period in response to the defragment time period not expiring, wherein the second set of the file elements is defragmented during the defragment time period in response to defragmenting all of the first set of the file elements and in response to the defragment time period not expiring, wherein the defragmenting one of the file elements in the first and second sets of the file elements is only performed after defragmenting file elements having a higher activity level and if the defragment time period has not expired, wherein the file elements having a lower activity level are skipped for defragmentation if the defragment time period expires before defragmenting file elements having higher activity levels.

23. The method of claim 19, wherein the determining the accesses for the file elements comprises determining a first set of accesses over a first time period and a second set of accesses over a second time period, and wherein using the determined accesses to determine the access metrics for the file elements comprises:
weighting the first set of accesses and the second set of accesses for the file elements to determine the access metrics for the file elements.

24. The method of claim 19, wherein the first set of the file elements is ordered in a decreasing order based on the access metrics of the file elements in the first set, wherein in the decreasing order a most accessed of the first set of the file elements is selected before less accessed file elements in the first set.

25. The method of claim 24, wherein the second set of the file elements is ordered in the decreasing order based on the access metrics of the file elements in the second set, wherein in the decreasing order a most accessed of the second set of the file elements is selected before less accessed file elements in the second set.

* * * * *